(12) United States Patent
Otto

(10) Patent No.: US 6,554,187 B2
(45) Date of Patent: Apr. 29, 2003

(54) METHOD OF DETECTING AND MANAGING RFID LABELS ON ITEMS BROUGHT INTO A STORE BY A CUSTOMER

(75) Inventor: Jerome A. Otto, Centerville, OH (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/816,579

(22) Filed: Mar. 23, 2001

(65) Prior Publication Data

US 2002/0134834 A1 Sep. 26, 2002

(51) Int. Cl.⁷ .............................................. G06K 15/00
(52) U.S. Cl. ........................ 235/383; 235/375; 235/385; 186/56; 705/16
(58) Field of Search ................................ 235/383, 384, 235/385, 462.25; 705/20

(56) References Cited

U.S. PATENT DOCUMENTS

| | | | | |
|---|---|---|---|---|
| 4,816,824 A | | 3/1989 | Katz et al. ............. | 340/825.34 |
| 5,151,684 A | | 9/1992 | Johnsen ....................... | 340/572 |
| 5,239,167 A | | 8/1993 | Kipp ........................... | 235/383 |
| 5,602,377 A | * | 2/1997 | Beller et al. ................. | 235/462 |
| 5,640,002 A | * | 6/1997 | Ruppert et al. .............. | 235/472 |
| 5,673,037 A | * | 9/1997 | Cesar et al. ............ | 340/825.54 |
| 5,745,036 A | * | 4/1998 | Clare ....................... | 340/572.1 |
| 5,978,774 A | * | 11/1999 | Rogers et al. .............. | 235/385 |
| 5,979,753 A | * | 11/1999 | Roslak ........................ | 235/380 |
| 6,019,394 A | * | 2/2000 | Chenoweth et al. .......... | 283/81 |
| 6,025,780 A | * | 2/2000 | Bowers et al. ............ | 340/572.3 |
| 6,119,100 A | * | 9/2000 | Walker et al. ................ | 705/20 |
| 6,198,391 B1 | * | 3/2001 | DeVolpi .................. | 340/568.2 |
| 6,409,082 B1 | * | 6/2002 | Davis et al. ................ | 235/385 |

* cited by examiner

Primary Examiner—Michael G. Lee
Assistant Examiner—Ahshik Kim
(74) Attorney, Agent, or Firm—Paul W. Martin

(57) ABSTRACT

A method of detecting an item in a store which determines whether the item is from a different store. The method includes the steps of interrogating an RFID label on an item in the store, and comparing RFID label information in the RFID label with store RFID label information to determine whether the RFID label is from another store different than the one store.

9 Claims, 2 Drawing Sheets

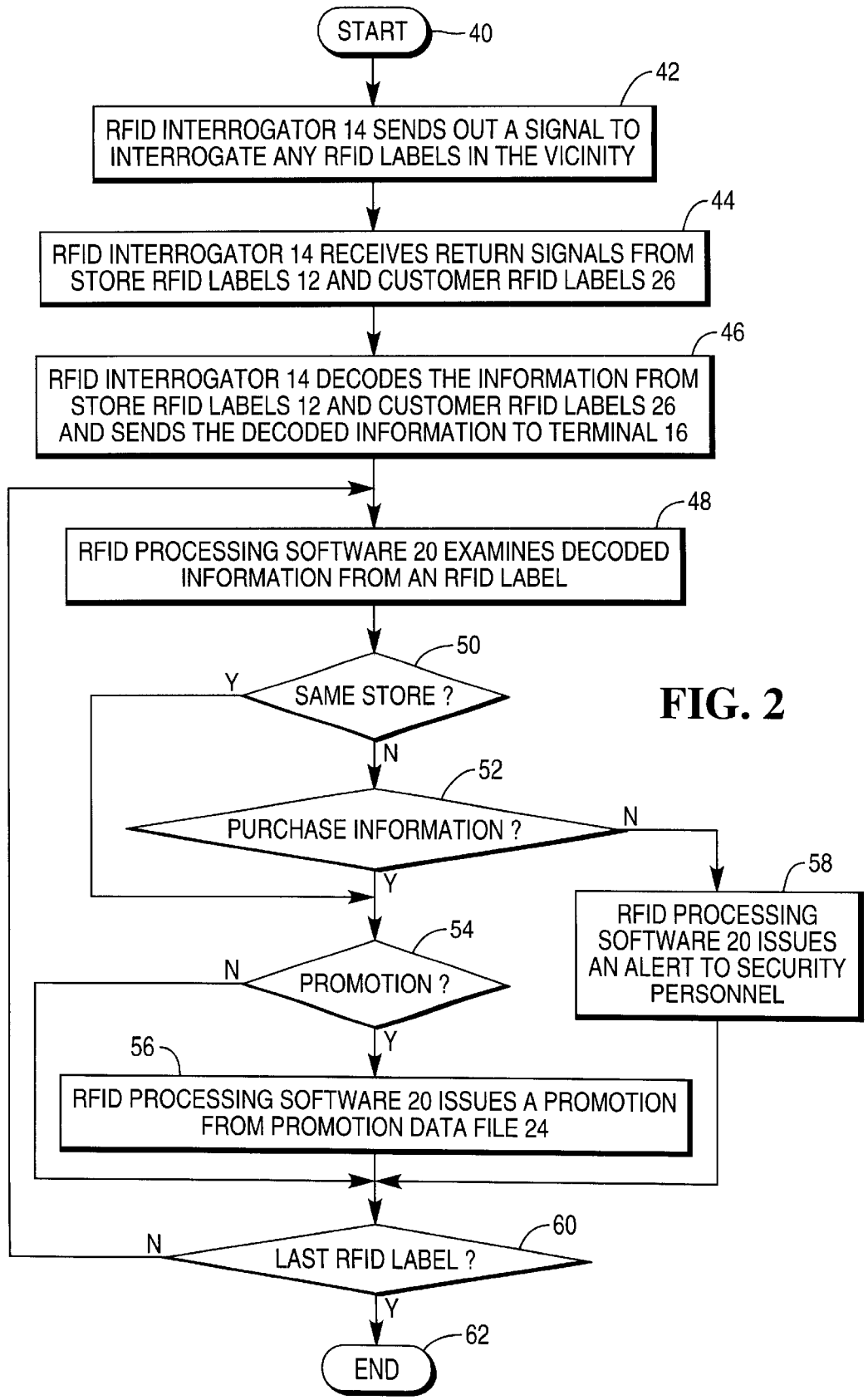

METHOD OF DETECTING AND MANAGING RFID LABELS ON ITEMS BROUGHT INTO A STORE BY A CUSTOMER

BACKGROUND OF THE INVENTION

The present invention relates to radio frequency identification (RFID) systems, and more specifically to a method of detecting and managing RFID labels on items brought into a store by a customer.

RFID technology provides an alternative to bar code reader technology for distinguishing and recording items for purchase. RFID may result in labor savings to retailers, since it may obsolete conventional methods of identifying products.

Some of the uses of RFID technology are disclosed in U.S. Pat. No. 6,019,394 assigned to the assignee of the present invention. This patent is hereby incorporated by reference.

RFID labels may be permanently attached to products. RFID labels permanently attached to clothing and other items may be worn or carried by customers into stores. These RFID labels may be detected by RFID interrogators within the stores.

Therefore, it would be desirable to provide a method of detecting and managing RFID labels on items brought into a store by a customer.

SUMMARY OF THE INVENTION

In accordance with the teachings of the present invention, a method of detecting and managing radio frequency identification (RFID) labels on items brought into a store by a customer is provided.

One embodiment of the method includes the steps of interrogating an RFID label on an item in the store, and comparing RFID label information in the RFID label with store RFID label information to determine whether the RFID label is from another store different than the one store.

The embodiment may further include the step of determining whether the RFID label contains purchase information if the RFID label is from the other store.

The embodiment may further include the step of classifying the item as being potentially stolen if the RFID label does not contain purchase information.

The embodiment may further include the step of comparing item identification information in the RFID label to store promotion information to determine whether to issue a promotion if the RFID label contains purchase information.

One embodiment of the system includes an RFID interrogator which obtains information from the RFID label, and a computer which compares the information in the RFID label with store RFID label information to determine whether the RFID label is from another store different than the one store.

The computer may additionally determine whether the RFID label contains purchase information, and, if the RFID label does not contain purchase information, alert store security personnel to track the person.

The computer may additionally compare item identification information in the RFID label with promotion information to determine whether to issue a promotion to the person if the RFID label contains purchase information.

It is accordingly an object of the present invention to provide a method of detecting and managing RFID labels on items brought into a store by a customer.

It is another object of the present invention to deliver promotions to customers who bring items bearing RFID labels into a store.

It is another object of the present invention to verify that items carried in a store by a customer are not stolen.

It is another object of the present invention to minimize theft and increase sales by managing RFID labels.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 2 is a flow diagram illustrating the method of the present invention.

DETAILED DESCRIPTION OF THE PREFERRED EMBODIMENT

Figure 1:
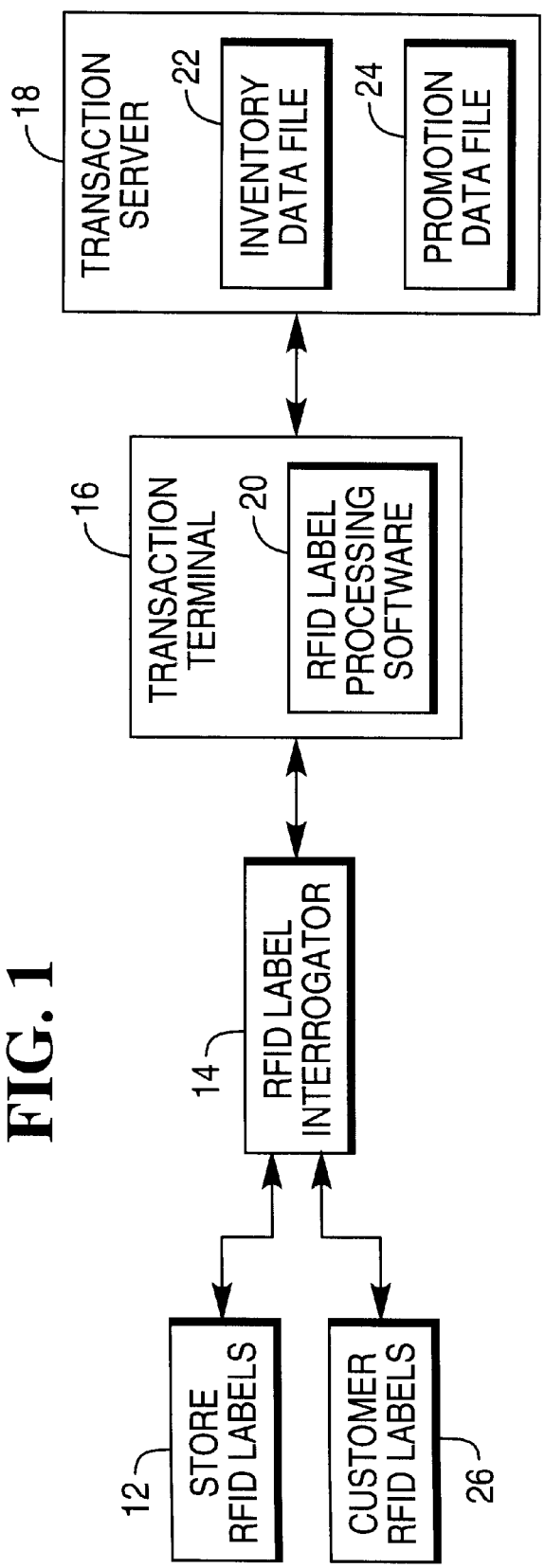
FIG. 1 is a block diagram of a transaction processing system.

Referring now to FIG. 1, transaction system 10 primarily includes RFID label interrogator 14, terminal 16, and server 18.

RFID interrogator 14 emits a signal and receives return signals from nearby store RFID labels 12 and customer RFID labels 26. RFID interrogator 14 decodes the return signals and provides information from store RFID labels 12 and customer RFID labels 26 to terminal 16.

RFID labels 12 and 26 store label and product identification information and various amounts of additional information, such as date and time of purchase, location of purchase, and seller. The additional information is stored at checkout.

Terminal 16 uses RFID interrogator 14 to read store RFID labels 12 and customer RFID labels 26. Terminal 16 may include a checkout transaction terminal, a return station computer, or a kiosk computer.

Terminal 16 executes RFID label processing software 20, which determines whether customer RFID label 26 is associated with an item from another store for which no purchase has been recorded within customer RFID label 26. Identification information for store RFID labels 12 is stored in inventory data file 22. If customer RFID label 26 contains store information for a different store but fails to contain purchase information, then the associated item may be considered stolen.

If customer RFID label 26 contains purchase information from the other store, then RFID label processing software 20 may additionally deliver promotions based upon detected item information in customer RFID label 26 using promotion data file 24.

For example, in the case of store RFID labels 12, terminal 16 may send product identification information to server 18 with price requests and server 18 may return the price information. If terminal 16 is a kiosk computer, RFID label processing software 20 may issue a coupon or other promotion based upon rules, products, or other criteria listed in promotion data file 24.

As another example, in the case of customer RFID labels 26, RFID label processing software 20 may issue an alert to security personnel if software 20 determines that the customer RFID label 26 associated with an item contains store information for a different store, but contains no purchase information. Security personnel may then watch the customer for signs of theft as the customer walks through the store.

Transaction server 18 handles price and inventory requests from terminal 16. Transaction server 18 also provides promotion information from promotion data file 24.

In FIG. 2, the method of operation of system 10 is illustrated in more detail beginning with START 40.

In step 42, RFID interrogator 14 sends out a signal to interrogate any RFID labels in the vicinity. The signal may be sent in response to an operator command or trigger or by a signal from a proximity sensor, similar to barcode readers.

If terminal 16 is a checkout station computer, then RFID interrogator 14 interrogates store RFID labels 12 on items to be purchased and customer RFID labels 26 on items carried or worn by the customer.

If terminal 16 is a return station computer, then RFID interrogator 14 interrogates customer RFID labels 26 on items to be returned and customer RFID labels 26 on other items carried or worn by the customer.

If terminal 16 is a kiosk, then RFID interrogator 14 interrogates store RFID labels 12 on items presented by the customer for price check and customer RFID labels 26 on items carried or worn by the customer.

In step 44, RFID interrogator 14 receives return signals from store RFID labels 12 and customer RFID labels 26.

In step 46, RFID interrogator 14 decodes the information from store RFID labels 12 and customer RFID labels 26 and sends the decoded information to terminal 16.

In step 48, RFID processing software 20 examines decoded information from an RFID label.

In step 50, RFID processing software 20 determines whether the decoded information represents an RFID label from a different store by comparing the RFID identification information with RFID identification information in inventory data file 22. If so, operation proceeds to step 52. Otherwise, operation jumps to step 54.

In step 52, RFID processing software 20 determines whether the decoded information contains purchase information from the different store. If so, operation proceeds to step 54. Otherwise, operation proceeds to step 58.

In step 54, RFID processing software 20 determines whether to issue a promotion based upon a comparison of the decoded information with promotion data file 24. If so, operation proceeds to step 56. Otherwise, operation proceeds to step 60.

In step 56, RFID processing software 20 issues a promotion from promotion data file 24.

In step 58, RFID processing software 20 issues an alert to security personnel if the RFID label fails to contain purchase information. Operation proceeds to step 60.

In step 60, RFID processing software 20 determines whether each piece of decoded information has been compared with inventory data file 22. If so, operation ends at step 62. Otherwise, operation returns to step 48.

Although the present invention has been described with particular reference to certain preferred embodiments thereof, variations and modifications of the present invention can be effected within the spirit and scope of the following claims.

I claim:

1. A method of detecting an item brought into a store by a person comprising the steps of:

interrogating an RFID label on the item;

comparing RFID label information in the RFID label with store RFID label information to determine that the RFID label is from another store different than the one store;

determining whether the RFID label contains purchase information; and if the RFID label does not contain purchase information, alerting store security personnel to track the person.

2. A method of detecting an item brought into a store by a person comprising the steps of:

interrogating an RFID label on the item;

comparing RFID label information in the RFID label with store RFID label information to determine that the RFID label is from another store different than the one store;

determining that the RFID label contains purchase information; and comparing item identification information in the RFID label to store promotion information to determine whether to issue a promotion.

3. A system for detecting an RFID label on an item in a store comprising:

an RFID interrogator which obtains information from the RFID label; and a computer which compares the information in the RFID label with store RFID label information to determine that the RFID label is from another store different than the one store, which determines whether the RFID label contains purchase information, and which, if the RFID label does not contain purchase information, alerts store security personnel to track the person.

4. A system for detecting an RFID label on an item brought into a store by a person comprising:

an RFID interrogator which obtains information from the RFID label; and a computer which compares the information in the RFID label with store RFID label information to determine that the RFID label is from another store different than the one store, and which compares item identification information in the RFID label with promotion information to determine whether to issue a promotion to the person.

5. A system for detecting an RFID label on an item brought into a store by a person comprising:

an RFID interrogator which obtains information from the RFID label; and a computer which compares the information in the RFID label with store RFID label information to determine that the RFID label is from another store different than the one store, which determines that the RFID label contains purchase information, and which compares item identification information in the RFID label with promotion information to determine whether to issue a promotion to the person.

6. A security method comprising the steps of:

interrogating an RFID label on an item worn by a person in a store;

comparing RFID label information in the RFID label with store RFID label information to determine whether the RFID label is from another store different than the one store;

if the RFID label is from the other store, determining whether the RFID label contains purchase information; and if the RFID label does not contain purchase information, classifying the item as being potentially stolen.

7. The method as recited in claim 6, further comprising the steps of:
   if the RFID label does not contain purchase information, alerting store security personnel to track the person.

8. A security method comprising the steps of:
   interrogating an RFID label on an item in a store;
   comparing RFID label information in the RFID label with store RFID label information to determine whether the RFID label is from another store different than the one store;
   if the RFID label is from the other store, determining whether the RFID label contains purchase information; and
   if the RFID label does not contain purchase information, classifying the item as being potentially stolen.

9. A system for detecting an RFID label on an item in a store comprising:
   an RFID interrogator which obtains information from the RFID label; and
   a kiosk containing the RFID interrogator which compares the information in the RFID label with store RFID label information to determine whether the RFID label is from another store different than the one store.

\* \* \* \* \*